(12) United States Patent
Zhang et al.

(10) Patent No.: US 7,948,942 B2
(45) Date of Patent: May 24, 2011

(54) METHOD AND SYSTEM OF USING A WIRELESS LINK IN THE BACKHAUL CONNECTION

(75) Inventors: Ji Zheng Zhang, Beijing (CN); Xi Yin Liu, Beijing (CN); Kun Shi, Beijing (CN); Na Sun, Beijing (CN); Yan Lai Wang, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 909 days.

(21) Appl. No.: 11/812,786

(22) Filed: Jun. 21, 2007

(65) Prior Publication Data

US 2008/0159212 A1 Jul. 3, 2008

(30) Foreign Application Priority Data

Dec. 29, 2006 (CN) .......................... 2006 1 0130906

(51) Int. Cl.
*H04Q 7/00* (2006.01)

(52) U.S. Cl. ......... 370/329; 370/338; 370/328; 455/450

(58) Field of Classification Search .................. 370/338, 370/330, 328, 329; 455/450
See application file for complete search history.

(56) References Cited

U.S. PATENT DOCUMENTS

| 2006/0209755 A1 | 9/2006 | Khan et al. | |
| 2007/0109992 A1* | 5/2007 | Bennett | 370/328 |
| 2007/0143307 A1* | 6/2007 | Bowers et al. | 707/10 |
| 2008/0112361 A1* | 5/2008 | Wu | 370/330 |

FOREIGN PATENT DOCUMENTS

EP  1 681 816  7/2006

OTHER PUBLICATIONS

Inernational Search Report and Written Opinion dated May 23, 2008.

* cited by examiner

*Primary Examiner* — Danh C Le
(74) *Attorney, Agent, or Firm* — Harness, Dickey & Pierce, P.L.C.

(57) ABSTRACT

One embodiment of the communication system includes a switch, at least one base station, and a backhaul connection including at least one wireless link connecting the at least one base station to the switch. The wireless link may include at least one of a WiMax carrier and a WiFi carrier.

9 Claims, 2 Drawing Sheets

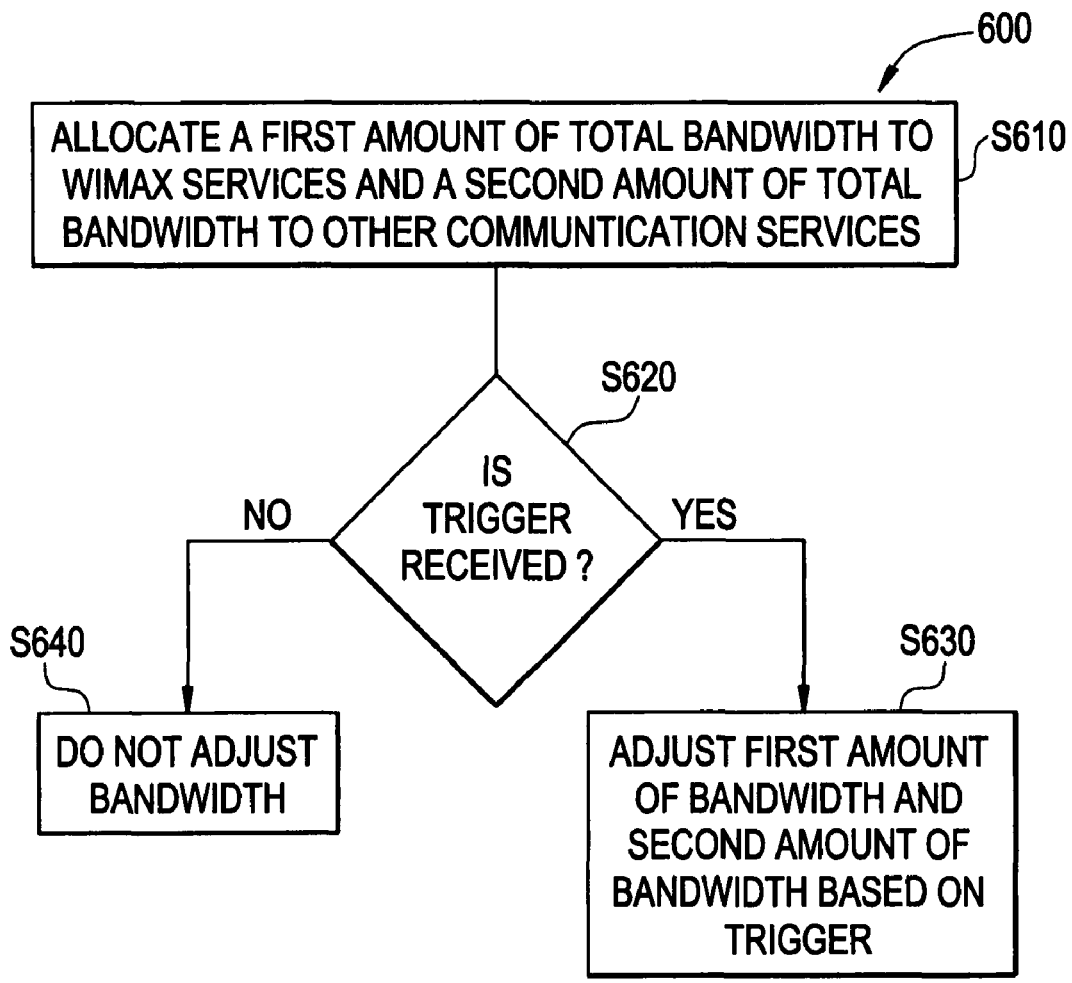

METHOD AND SYSTEM OF USING A WIRELESS LINK IN THE BACKHAUL CONNECTION

PRIORITY STATEMENT

This non-provisional U.S. patent application claims priority under 35 U.S.C. §119 to Chinese Patent Application No. 200610130906.0 filed on Dec. 29, 2006, the entire contents of which are incorporated herein by reference.

BACKGROUND OF INVENTION

1. Field of the Invention

The present invention is related to a system and method for telecommunications. More particularly, the present invention relates to a system and method of using Worldwide Interoperability for Microwave Access (WiMax) technology and/or Wireless Fidelity (WiFi) technology as the backhaul in deploying base stations. WiMax relates to the IEEE 802.16 wireless broadband standard, and WiFi refers to the IEEE 802.11b wireless networking standard.

2. Background Information

Conventional wireless communication networks typically include a plurality of base stations that provide wireless connectivity to one or more geographical areas, which are usually referred to as cells. Mobile stations may establish wireless communication links with one or more of the base stations according to one or more wireless communication protocols, such as Universal Mobile Telecommunication Service (UMTS), Global System for Mobile communications (GSM), Code Division Multiple Access (CDMA, CDMA 2000), etc. As used herein, mobile stations include cellular telephones, personal data assistants, smart phones, text messaging devices, laptop computers, etc.

Base stations are typically connected to the wireless communication network by a switch, such as a Radio Network Controller (RNC) or a Mobile Switching Center (MSC), by a backhaul connection. Multiple base stations and switches may share the same physical backhaul facility. The backhaul capacity is usually considered to be one of the scarcest resources in a wireless communication network, at least in part because service providers often lease portions of the backhaul connection. For example, a service provider may lease a portion of a T1 connection to use as a backhaul connection. Service providers may then engineer the backhaul connection so that it does not cover the worst-case scenario. The worst-case scenario is the scenario in which all base stations transmit and receive at their individual maximum capacities at the same time. This deliberate under-engineering of the backhaul connection may cause backhaul contentions to arise between different users and/or different data flows.

Conventionally, the backhaul connections are wired connections. For example, conventional backhaul connections may include T1 carriers, E1 carriers and STM/OC3 carriers, for example. T1, E1 and STM/OC3 carriers are well-known wired network lines and thus, specifics of these carriers will not be discussed herein for the sake of brevity. However, it is noted that because these carriers are wired connections there are various disadvantages and costs associated with using these carriers for the backhaul connections. For example, deploying cables in metropolitan areas may be difficult and/or expensive. Some cities may have prohibitions on placing carriers above ground and thus, all the backhaul cables may be required to be placed below ground resulting in additional costs.

Example embodiments of the present invention, which are detailed in the following section of this application are directed to addressing issues relating to conventional backhaul systems and relate to backhaul systems and methods implementing wireless connections, such as WiMax and WiFi connections.

SUMMARY OF THE INVENTION

The present invention relates to a system and/or method of using a wireless link in a backhaul connection.

For example, one embodiment of the communication system includes a switch, at least one base station, and a backhaul connection including at least one wireless link connecting the at least one base station to the switch. The wireless link may include at least one of a WiMax carrier and a WiFi carrier.

An embodiment of the method of allocating bandwidth of a wireless link (e.g., at least one WiMax carrier and/or at least one WiFi carrier) in a backhaul connection includes allocating a first bandwidth amount of wireless link bandwidth to WiMax services and a second bandwidth amount of the wireless link bandwidth to other communication services. If a trigger signaling that at least one condition of the communication system has changed is received, the first bandwidth amount and the second bandwidth amount are adjusted in response to the trigger.

For example, the method may include monitoring the at least one condition of the communication system. The at least one condition is at least one of backhaul usage, backhaul congestion, a first unused amount of the first bandwidth amount, a second unused amount of the second bandwidth amount, and time. The trigger is generated based on the at least one monitored condition reaching an associated threshold.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein:

FIG. 2 illustrates an example embodiment of a method for allocating communication services provided in the example communication network architecture of FIG. 1;

DETAILED DESCRIPTION OF EXAMPLE EMBODIMENTS

Figure 1:
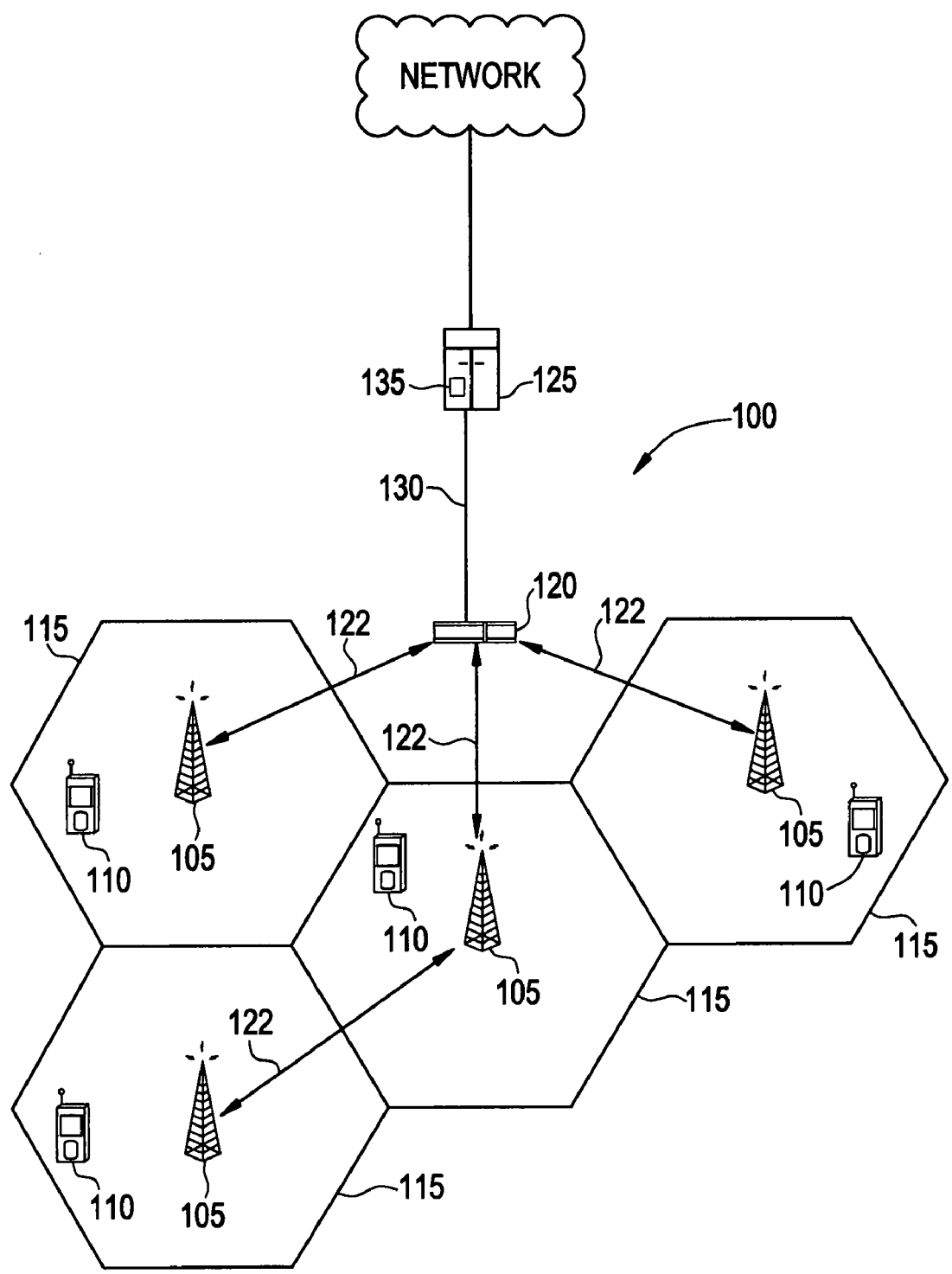
FIG. 1 is a block diagram of an example communication network architecture for implementing a system and related methods of using wireless connections for a backhaul in a communication system according to the present invention.

Example embodiments of the present invention are described below. In the interest of clarity, not all possible features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The example embodiments are described below with reference to the attached drawings. Various structures, systems and devices are schematically depicted in the drawings for purposes of explanation only and so as to not obscure the present invention with details that are well known to those skilled in the art. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 is a block diagram of an example communication network architecture for implementing a system and related methods of using wireless connections for a backhaul in a communication system according to the present invention.

In FIG. 1, one or more base stations 105 provide wireless connectivity to mobile stations 110 in geographic areas, referred to herein as cells 115, associated with each base station 105. Persons of ordinary skill in the art should appreciate that the specific number of base stations 105, mobile stations 110, and cells 115 are not material to the present invention and any number of base stations 105, mobile stations 110, and cells 115 may be included in the wireless communication system 100. In various alternative embodiments, the base stations 105 may provide wireless connectivity according to any desirable protocol including, but not limited to, a Universal Mobile Telecommunication Service (UMTS) protocol, a Global System for Mobile communications (GSM) protocol, a Code Division Multiple Access (CDMA, CDMA 2000) protocol, an Evolved, Data Optimized (EVDO) protocol, Bluetooth, and one or more IEEE 802.11 protocols, for example.

As shown in FIG. 1, a router 120 is communicatively coupled to a switch 125 by a dedicated link 130, which may also be referred to as a long haul link 130. The router 120 may aggregate information provided by the base stations 105 and then attempt to transmit the aggregated information to the switch 125 over the dedicated link 130. The router 120 may also receive information intended to be transmitted to one or more of the base stations 105 from the switch 125 over the dedicated link 130. The router 120 may then attempt to provide the information received from the switch 125 to the appropriate base station 105 via intermediate links 122.

The base stations 105 can receive data from the mobile stations 110 and provide this data to the router 120 via the intermediate links 122. The base stations 105 can also receive data from the router 120 that is intended for one or more of the mobile stations 110. In one embodiment, the data provided to, or received from, the router 120 includes one or more data packets, which may be formed according to protocols such as an Internet Protocol (IP).

The data provided to, or received from, the router 120 may be associated with one or more application data flows. The term "application data flow," as used herein, refers to data flows associated with a particular application associated with one or more of the mobile stations 110. The application data flow may refer to packets that are formed, transmitted, received and/or decoded by the application and/or mobile station 110, as well as the hardware and/or software used to form, transmit, receive, and/or decode the packets. In various alternative embodiments, a mobile station 110 may be capable of supporting a single application data flow and/or a plurality of concurrent application data flows. For example, mobile stations 110 may be able to support concurrent application data flows for multiple delay-sensitive applications, such as a VoIP application and an interactive gaming application. For another example, mobile stations 110 may be able to support concurrent application data flows for delay-sensitive and non-delay-sensitive applications, such as a VoIP application and an Internet browsing application.

According to an example embodiment of the present invention, the intermediate links 122, the router 120 and the dedicated link 130 form a backhaul connection between the mobile stations 110 and the switch 125. As used herein, the term "backhaul connection" refers to a connection that transmits information between one or more access points or base stations 105 and one or more switches 125. The one or more switches 125 may then be connected to another network (not shown). In some embodiments of wireless communication systems, the backhaul connection provides a communication link between one or more base stations 105 and a Radio Network Controller (RNC) as the switch 125. However, persons of ordinary skill in the art should appreciate that the backhaul connection may connect other types of devices. For example, the endpoints of the backhaul connection may include wireless access points, Mobile Switching Centers (MSC), etc. Further, persons of ordinary skill in the art should appreciate that the embodiment shown in FIG. 1 is illustrative and not intended to limit the present invention. For example, alternative embodiments may include more or fewer base stations, routers, and/or switches.

According to an example embodiment, one or more of the links included in the backhaul connection are wireless links. As a first example, one of the links 122 and 130 are WiMax or WiFi carriers. As a second example, all of the links 122 and 130 associated with backhaul for the communication system are WiMax or WiFi carriers.

Generally, WiMAX may be used as a means of increasing bandwidth for a variety of data-intensive applications. According to an example embodiment of the present invention, WiMax carriers, instead of conventional T1 and E1 carriers, are used in at least one of the links to provide backhaul for a communication system to reduce costs associated with the backhaul. Given the limited wired infrastructure in some developing countries, the costs to install a WiMAX station in conjunction with an existing cellular tower, or even as a solitary hub, are likely small as compared with the conventional wired solution. Areas of low population density and flat terrain are particularly suited to WiMax and take full advantage of the range provided by WiMax carriers.

Similar to WiMax carriers, WiFi carriers also allow Local Access Networks (LANs) to be deployed without cabling, typically reducing the costs of network deployment and expansion. According to example embodiments of the present invention, WiFi carriers may also be used as one or more carriers for the backhaul of a communication system.

According to an example embodiment of the present invention one or more of the base stations 105, router 120 or switch 125 includes a backhaul controller 135. In FIG. 1, the backhaul controller 135 is shown as included in the switch 125. The backhaul controller 135 controls the allocation of bandwidth of the WiMax or WiFi carriers in the communication system of FIG. 1. The backhaul controller 135 may measure the backhaul usage, congestion state, WiMax bandwidth usage, and other communication services usage; and adjust the allocation of bandwidth based on algorithms considering the backhaul usage, congestion state, or WiMax bandwidth. Alternatively, the backhaul controller 135 may adjust the allocation of bandwidth based on a general usage pattern. An example method performed by the backhaul controller 135 is described with respect to FIG. 2.

FIG. 2 illustrates an example embodiment of a method for allocating communication services provided in the example communication network architecture 100 of FIG. 1. In the example communication network architecture 100, one or more of the links 122 and 130 are wireless connections. For example, all of the links 122 and 130 may be WiMax carriers.

According to an example embodiment of the present invention, WiMax services and communication services are provided using the network architecture of FIG. 1. To provide WiMax services, the system uses a first amount of bandwidth of the WiMax carriers as WiMax service bandwidth. The WiMax mobile stations 110 in FIG. 1 communicate with base stations using this first amount of bandwidth. Further, the system provides other communication services concurrently with the WiMax services. These communication services include, but are not limited to, GSM, WCDMA, CDMA2000, CDMA95, TD-SCDMA, etc. To provide these communication services, the system uses a second amount of bandwidth of the WiMax carriers. However, the system also has to use an amount of bandwidth to serve as the backhaul for both the WiMax and communication services, share the backhaul with other wireless communication systems, or connect directly to a Local Managed IP Network (not shown).

The amount of use of the WiMax services and communication services affects the amount of backhaul required for the WiMax services and the communication services. Accordingly, if the amount of WiMax services being used is larger than the amount of communication services being used, the WiMax services require a larger amount of bandwidth than the communication services. The larger amount of bandwidth is required because (1) a larger amount of WiMax services are being used and (2) the backhaul required to provide the WiMax services increases as the amount of WiMax services being used increases.

Accordingly, step S610 of FIG. 2 illustrates that the backhaul controller 135 allocates a first amount of bandwidth of the WiMax carriers to WiMax services and allocates a second amount of the bandwidth of the WiMax carrier to other communication services. For example, during an initial setup of the backhaul controller 135, the backhaul controller 135 defaults to a setting configured such that one half of the available bandwidth of the WiMax carriers is provided for the other communication services and backhaul related to these other communication services and the remaining one half of the available bandwidth of the WiMax carriers is provided for the WiMax services and backhaul related to the WiMax services.

In step S620, the backhaul controller 135 determines if a trigger is received. The trigger may be an internal or external trigger. For example, the trigger may be based on measured backhaul usage, congestion, WiMax bandwidth, bandwidth of other communication services, or usage patterns. An example based on usage patterns, and another based on a measured and/or monitored parameter, are described below.

For example, usage patterns may indicate that more bandwidth is required for WiMax services during business hours, whereas more bandwidth is required for communication services during off hours. Assuming business hours typically end at 5:00 PM, the controller 135 generates and/or receives a trigger at 5:00 PM signaling the end of business hours.

As another example, the backhaul controller 135 monitors the amount of unused first bandwidth for WiMax services and the amount of unused second bandwidth for other communication services. An upper and lower threshold is set for both the unused bandwidth of the WiMax services and the unused bandwidth of the other communication services. If the amount of unused first bandwidth of the WiMax services crosses a lower threshold indicating there is only a relatively small portion of the first amount of bandwidth available to support additional WiMax services and related backhaul, and if the amount of unused second bandwidth of the communication services crosses an upper threshold indicating that there is a relatively large portion of the second amount of bandwidth still available to support additional other communication services and related backhaul; the backhaul controller 135 generates and/or receives a trigger indicating that the bandwidth of the WiMax carries should reallocate the first amount and second amount of bandwidth.

If a trigger is received in step S620, the method of FIG. 2 proceeds to step S630 in which the first amount of bandwidth and the second amount of bandwidth is reallocated to ensure that there is sufficient bandwidth for the backhaul of the communication system. For example, if the first amount of bandwidth allocated to WiMax services and related backhaul is initially 50% of the bandwidth of the WiMax carriers and the second amount of bandwidth allocated to other communication services and related backhaul is initially 50%; in response to a trigger indicating that more bandwidth is required for WiMax services, the backhaul controller 135 adjusts the first amount of bandwidth allocated to WiMax services and related backhaul to be 75% of the bandwidth of the WiMax carriers and adjusts the second amount of bandwidth allocated to other communication services to be 25% of the bandwidth of the WiMax carriers.

Alternatively, if a trigger is not received in step S620, the method of FIG. 2 proceeds to step S640, and the backhaul controller does not reallocate the bandwidth of the WiMax carriers.

As explained above according to example embodiments of the present invention, the bandwidth of the WiMax carriers can be adjusted dynamically or statically to ensure that sufficient bandwidth is provided to support the WiMax services, other communication services, and backhaul related to the WiMax and other communication services.

One or more of the techniques described above may have advantages over conventional practice. For example, allocating resources based upon an indication of congestion in a backhaul connection may reduce packet latency and/or the number of packets that may be dropped. Accordingly, wireless radio access networks that allocate resources based upon an indication of congestion in backhaul connections may be able to meet Quality of Service requirements associated with data packets, such as a delay-sensitive data packets that may be used for Voice over Internet Protocol (VoIP), video telephony, and/or interactive gaming.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed:

1. A method of allocating bandwidth of a wireless link in a backhaul connection in a communication system, the method comprising:
    allocating a first bandwidth amount of backhaul wireless link bandwidth to WiMax services and a second bandwidth amount of the backhaul wireless link bandwidth to other communication services;
    receiving a trigger signaling that at least one condition of the communication system has changed; and
    adjusting the first bandwidth amount and the second bandwidth amount in response to the trigger.

2. The method of claim 1, wherein the wireless link includes a WiMax carrier.

3. The method of claim 1, wherein the wireless link includes a WiFi carrier.

4. The method of claim 1, wherein the wireless link includes a WiMax carrier and a WiFi carrier.

5. A method of allocating bandwidth of a wireless link in a backhaul connection in a communication system, the method comprising:
    allocating a first bandwidth amount of wireless link bandwidth to WiMax services and a second bandwidth amount of the wireless link bandwidth to other communication services;
    receiving a trigger signaling that at least one condition of the communication system has changed;
    adjusting the first bandwidth amount and the second bandwidth amount in response to the trigger;
    monitoring the at least one condition of the communication system, the at least one condition being at least one of backhaul usage, backhaul congestion, a first unused amount of the first bandwidth amount, a second unused amount of the second bandwidth amount, and time; and
    generating the trigger based on the at least one monitored condition reaching an associated threshold.

6. The method of claim 5, wherein the adjusting step comprises:
    determining one of the first bandwidth amount and the second bandwidth amount to increase based on the trigger;
    increasing the determined one of the first bandwidth amount and the second bandwidth amount; and
    decreasing the other one of the first bandwidth amount and the second amount.

7. The method of claim 5, wherein the at least one monitored condition is time and the associated threshold is a time of day.

8. A method of allocating bandwidth of a wireless link in a backhaul connection in a communication system, the method comprising:
    allocating a first bandwidth amount of wireless link bandwidth to WiMax services and a second bandwidth amount of the wireless link bandwidth to other communication services;
    receiving a trigger signaling that at least one condition of the communication system has changed;
    adjusting the first bandwidth amount and the second bandwidth amount in response to the trigger;
    monitoring a first unused amount of the first bandwidth amount and a second unused amount of the second bandwidth amount; and
    generating the trigger if the first unused amount exceeds a first threshold amount and the second bandwidth amount falls below a second threshold amount,
    wherein the adjusting step increases the first bandwidth amount and decreases the second bandwidth amount in response to the trigger.

9. A method of allocating bandwidth of a wireless link in a backhaul connection in a communication system, the method comprising:
    allocating a first bandwidth amount of wireless link bandwidth to WiMax services and a second bandwidth amount of the wireless link bandwidth to other communication services;
    receiving a trigger signaling that at least one condition of the communication system has changed;
    adjusting the first bandwidth amount and the second bandwidth amount in response to the trigger;
    monitoring a first unused amount of the first bandwidth amount and a second unused amount of the second bandwidth amount; and
    generating the trigger if the first unused amount falls below a first threshold amount and the second bandwidth amount exceeds a second threshold amount,
    wherein the adjusting step increases the second bandwidth amount and decreases the first bandwidth amount in response to the trigger.

* * * * *

UNITED STATES PATENT AND TRADEMARK OFFICE
CERTIFICATE OF CORRECTION

PATENT NO. : 7,948,942 B2
APPLICATION NO. : 11/812786
DATED : May 24, 2011
INVENTOR(S) : Ji Zheng Zhang et al.

Page 1 of 2

It is certified that error appears in the above-identified patent and that said Letters Patent is hereby corrected as shown below:

In the Claims
Col. 8, claim 8, lines 4-23 should read:

A method of allocating bandwidth of a wireless link in a backhaul connection in a communication system, the method comprising:
allocating a first bandwidth amount of wireless link bandwidth to WiMax services and a second bandwidth amount of the wireless link bandwidth to other communication services;
receiving a trigger signaling that at least one condition of the communication system has changed;
adjusting the first bandwidth amount and the second bandwidth amount in response to the trigger;
monitoring a first unused amount of the first bandwidth amount and a second unused amount of the second bandwidth amount; and
generating the trigger if the ~~first~~ <u>second</u> unused amount exceeds a first threshold amount and the ~~second~~ <u>first</u> bandwidth amount falls below a second threshold amount,
wherein the adjusting step increases the first bandwidth amount and decreases the second bandwidth amount in response to the trigger.

Col. 8, Claim 9, lines 24-43 should read:

A method of allocating bandwidth of a wireless link in a backhaul connection in a communication system, the method comprising:
allocating a first bandwidth amount of wireless link bandwidth to WiMax services and a second bandwidth amount of the wireless link bandwidth to other communication services;
receiving a trigger signaling that at least one condition of the communication system has changed;
adjusting the first bandwidth amount and the second bandwidth amount in response to the trigger;

Signed and Sealed this
Twenty-fifth Day of June, 2013

Teresa Stanek Rea
*Acting Director of the United States Patent and Trademark Office* monitoring a first unused amount of the first bandwidth amount and a second unused amount of the second bandwidth amount; and generating the trigger if the ~~first~~ <u>second</u> unused amount falls below a first threshold amount and the ~~second~~ <u>first</u> bandwidth amount exceeds a second threshold amount, wherein the adjusting step increases the second bandwidth amount and decreases the first bandwidth amount in response to the trigger.